United States Patent [19]
Kreye

[11] Patent Number: 5,527,083
[45] Date of Patent: Jun. 18, 1996

[54] CAR-BODY WINDOW FRAME ASSEMBLY

[75] Inventor: Bernhard Kreye, Wunstorf, Germany

[73] Assignee: Henniges Elastomer - U, Rehburg Loccum, Germany

[21] Appl. No.: 208,659

[22] Filed: Mar. 11, 1994

[30] Foreign Application Priority Data

Mar. 11, 1993 [DE] Germany .......................... 43 07 634.3

[51] Int. Cl.6 ................................................. B60J 10/02
[52] U.S. Cl. ....................... 296/146.15; 52/208; 296/201
[58] Field of Search ........................ 296/146.15, 96.21, 296/93, 201; 52/208, 204.597

[56] References Cited

U.S. PATENT DOCUMENTS

| | | | |
|---|---|---|---|
| 4,984,839 | 1/1991 | Miyakawa et al. | 296/96.21 X |
| 4,986,595 | 1/1991 | Gold | 296/93 X |
| 5,074,610 | 12/1991 | Tamura et al. | 52/204.597 X |
| 5,283,100 | 2/1994 | Yui et al. | 296/93 X |

FOREIGN PATENT DOCUMENTS

| | | |
|---|---|---|
| 0494824 | 7/1992 | European Pat. Off. . |
| 2340217 | 9/1977 | France . |
| 2520428 | 1/1983 | France ........................... 52/208 |
| 3447271 | 6/1986 | Germany . |
| 3742719 | 7/1989 | Germany . |
| 61-135822 | 11/1986 | Japan . |

*Primary Examiner*—David M. Mitchell
*Assistant Examiner*—Kia M. Robinson
*Attorney, Agent, or Firm*—Longacre & White

[57] ABSTRACT

The present disclosure concerns a car-body window assembly with a peripheral frame embracing the window glass pane. The assembly is designed to allow balancing the relative positions of the pane and the frame before final assembly onto the sheetmetal of a car-body. Apertures and channels in the frame permit adhesive to be deposited after the frame and the glass have been initially aligned.

19 Claims, 6 Drawing Sheets

CAR-BODY WINDOW FRAME ASSEMBLY

BACKGROUND OF THE INVENTION a) Field of the Invention

The invention concerns a car-body window frame assembly with a peripheral frame gripping a window pane. Further, the pane may be an insulating glass pane.

b) Description of Related Art

Known car-body windows have the disadvantage that because of technical manufacturing limitations, the panes cannot be made uniformly enough that precisely the same dimensions are obtained for each pane. Discrepancies of about ±1 mm in the direction of the peripheral edges of the pane are often encountered. Such discrepancies are at once visible to the observer and there is difficulty compensating for such a shifted position of the pane.

In any event such compensation is precluded if the pane has already been bonded to the frame.

SUMMARY OF THE INVENTION

An objective of the present invention is to provide a car-body window frame assembly such that positional compensation between the pane and the frame can be undertaken before the pane is definitively fixed in the frame.

This problem is solved by the present invention in that the frame leg facing the body sheetmetal comprises channel(s) and/or apertures allowing passage of a bonding agent so that the frame and the glass pane can be bonded together.

This design makes it possible to correct the initial state of bonding between frame and pane. In particular it offers the advantage of mutually aligning pane and frame or vice-versa before the car-body window has been assembled to the car-body. The alignment of the frame with the pane can be carried out as a preliminary function with positionally accurate joining of these parts subsequently taking place. Affixation proper takes place by depositing the bonding agent, which grips the glass pane, through the channel(s) and/or apertures.

However, further alignment will be impossible following affixation by the bonding agent.

In an especially advantageous manner, the frame shall be constructed of a material such as PVC or the like, to which polyurethane adhesives do not bond.

Nevertheless, the channel(s) and/or apertures create partial bonding wherein the adhesive adheres to the glass but not to the frame material. Mechanical links are created by virtue of the adhesive intertwining and interlocking with the frame material.

In the areas of the channel(s) and/or apertures, the pane may additionally be fastened by a peripheral bead of adhesive to the body sheetmetal. The bead possibly being compressed during assembly between the body sheetmetal and the opposite side of the pane. Thus the adhesive bead is prestressed in this design.

On one hand the available pane area may not be fully utilized if transverse crossbars for the channel(s) lie against the pane, thereby precluding contact between the pane and the adhesive. To address this disadvantage, the frame may be designed in such a way as to maximize the pane area serving as the bonding surface.

The invention may also provides a frame fitted with a channel not only on its side facing the pane, but also a second channel on its opposite side with apertures extending between the first and second channels. This enlarges the area of contact between adhesive and frame which will commensurately strengthen the bond.

Obviously, attention must be paid so that the channel(s) are completely filled with the polyurethane adhesive during assembly; therefore an adhesive of such consistency is selected so that it will flow into the channel(s) and apertures. Upon complete filling thereof, curing of the polyurethane adhesive occurs, and substantial bonding strength is achieved on account of molecular crosslinking, especially where two-component adhesives are involved.

It is another object of the present invention that a frame consisting of rubber or a rubbery plastic be formed with the channel(s) and/or apertures.

Further, by metering an amount of adhesive such that during pre-assembly, the channel(s) and apertures which will face the body sheetmetal are overfilled; during assembly, the body sheetmetal touches the adhesive, causing direct bonding of the body sheetmetal to the frame.

Improved adhesion may also be achieved in this instance with a second channel present on the frame side facing the body sheetmetal and opposite the first channel. Similarly, adhesion by both sides of the frame is increased if the second channel is also uninterrupted by cross-bars or the like interfering with surface contact of the adhesive.

In some circumstances, difficulties may be encountered filling the apertures and channel(s) with bubble-free adhesive, therefore the invention further provides depositing an additional bead of a polyurethane adhesive on the frame side facing the body sheetmetal. During assembly, the additional bead of polyurethane adhesive is compressed on top of the polyurethane adhesive already present to secure the frame and the pane (i.e. in the apertures and channels).

In this manner, known bonding techniques wherein an additional bead of polyurethane adhesive is not deposited next to, but upon the bead of adhesive already present inside the channel(s) and apertures in the frame. Consequently, the thick and copious glue bead common in the prior art between the pane and the body sheetmetal can be eliminated.

The distance from the surface of the frame cross-bar facing the body sheetmetal to this sheetmetal also lends itself to being minimized according to the present invention. For instance, by maintaining this a uniform distance from the shape of the body sheetmetal, or by making the cross-bar thicker, a rather significant amount of adhesive material will be saved. This also provides the advantages of simpler assembly and shorter assembly times.

Bonding in a single operation while using a single bead of adhesive does assume the frame is oriented in an essentially horizontal position. Otherwise the adhesive stored in the apertures and the channel(s) of the frame may run out, especially if the time between filling-in the adhesive and bonding to the body sheetmetal exceeds 5 minutes.

Obviously it is feasible to develop a single- or a double-component adhesive having the appropriate consistency and retaining its position upon deposition for several minutes. Thereby, a pane prepared in such manner can be provided in a single operation with adhesive and be bonded into the body sheetmetal. Besides single-component polyurethane foams, a double-component polyurethane foams are also suitable.

Obviously any sort of adhesive may be interlocked among the cross-bars and apertures in the frame as long as the adhesive is suitable to adhere to both the glass pane and the body sheetmetal. To assure adhesion to the body sheetmetal, a corresponding primer may be used for a particular adhesive material.

Adhesives such as foam may be open- or closed-pore materials. If the adhesive is of the open-pore kind, there is a danger that moisture may enter the space between the body sheetmetal and the frame, even if only slightly. This can be prevented by locating a flexible sealing lip between the frame and the body sheetmetal, and which in the assembled state is prestressed by the body sheetmetal. This feature makes the present invention especially suitable for using open-pore foams.

The length of the sealing lip may be about a third of the total thickness of glass pane plus two frame thicknesses.

The frame may be made of polyvinylchloride (PVC) or elastomers of other kinds, as well as thermoplastics and thermoplastic elastomers, in particular.

The above described sealing lip may be used regardless of the form of the adhesive bond, that is, it will be applicable in preventing access to moisture both when using a single-bead polyurethane adhesive, a double-bead polyurethane adhesive and/or adhesives of this kind with appropriate foam additives or only foams.

When using elastomers for the frame material, the sealing lip will need to offer especially high elasticity and therefore it may also be replaced by another material, for instance by a separate adhering part with a specific cross-sectional contour. Appropriately, a square contour made out of a sponge rubber material may be fixed with double-faced adhesive tape to both the bead of adhesive and the side of the frame.

Moreover care shall be taken that the largest possible surface of the sponge rubber lip is sandwiched between the frame and the body sheet metal so that the adhesive tape shall be prestressed during assembly.

Other contours and other materials may be used instead of a sponge-rubber bar with a square cross-sectional contour. Illustratively, toroids of rubber or rubbery plastics, preferably hard rubber, are also suitable.

To hold the pane in place prior to assembly, fastening clamps may be provided that engage a groove underneath the apertures or channel(s), and span a clear edge to the body sheetmetal.

The invention is elucidated below in relation to the embodiments shown in the drawings.

DESCRIPTION OF THE PREFERRED EMBODIMENT

Figure 1:
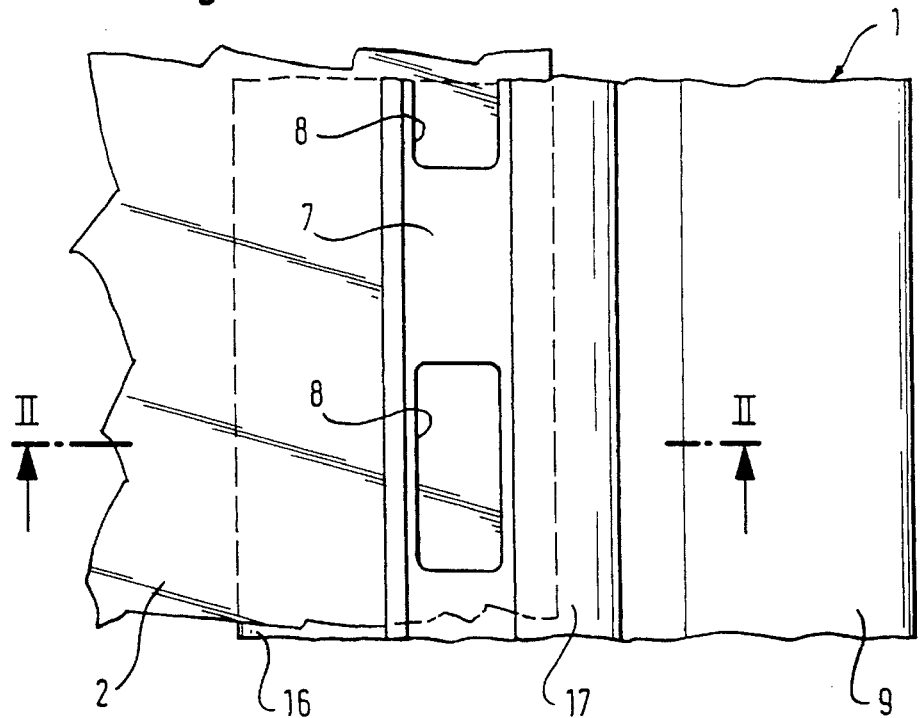
FIG. 1 is a plan view of a short linear segment of the frame according to the present invention.
Figure 2:
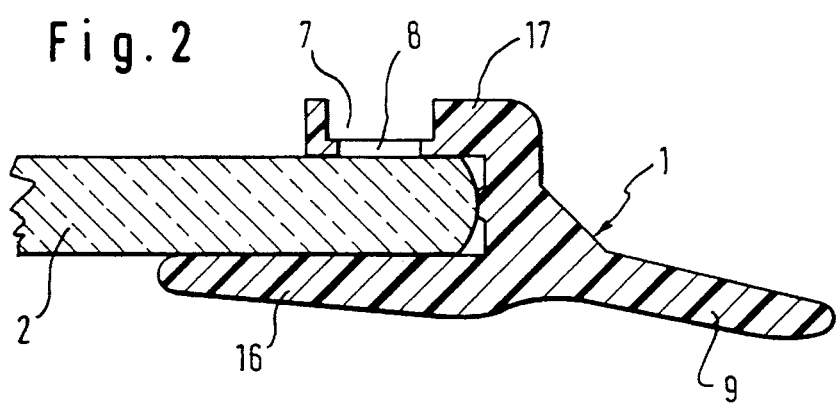
FIG. 2 is a section view taken along line II—II in FIG. 1.
Figure 3:
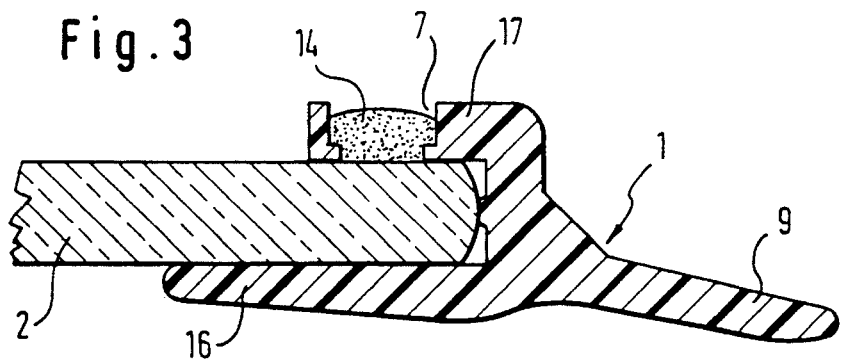
FIG. 3 is a similar section view as FIG. 2 after the adhesive has been inserted.

The present invention, as shown in FIGS. 1 and 2, includes a frame 1 provided with two legs 16, 17 and a sealing lip 9. The legs 16, 17 embrace a glass pane 2 on both its faces. The leg 17 confronting the car-body sheetmetal 12 (please see FIG. 5) comprises a U-shaped channel 7 adapted to receive an adhesive 14 (please see FIG. 3). Spaced apertures 8 pierce the base of the channel 7 in the leg 17 to allow the adhesive 14 to pass through the leg 17 toward the glass pane 2. Bonding is implemented through only the spaced apertures 8 which enhances the ability of the frame 1 becoming detached from the glass pane 2.

Figure 4:
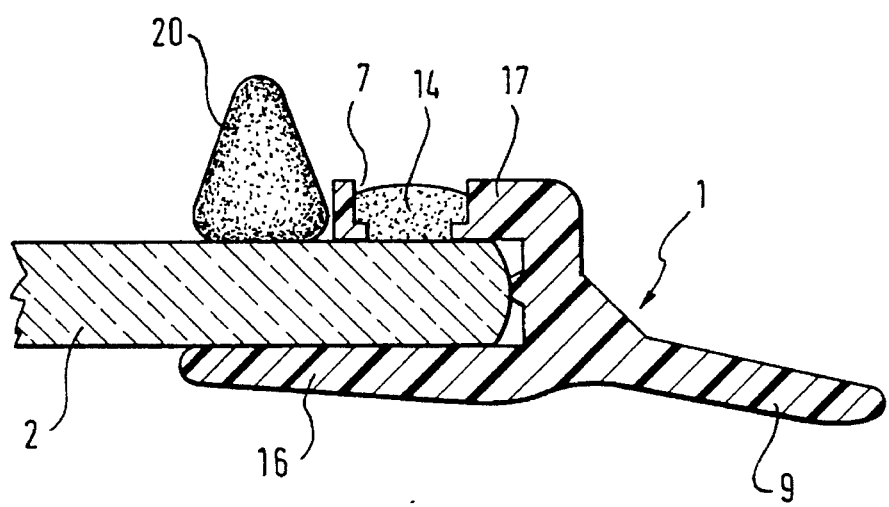
FIG. 4 is a similar section view as FIG. 2 wherein an adhesive is additionally used as a sealant.
Figure 5:
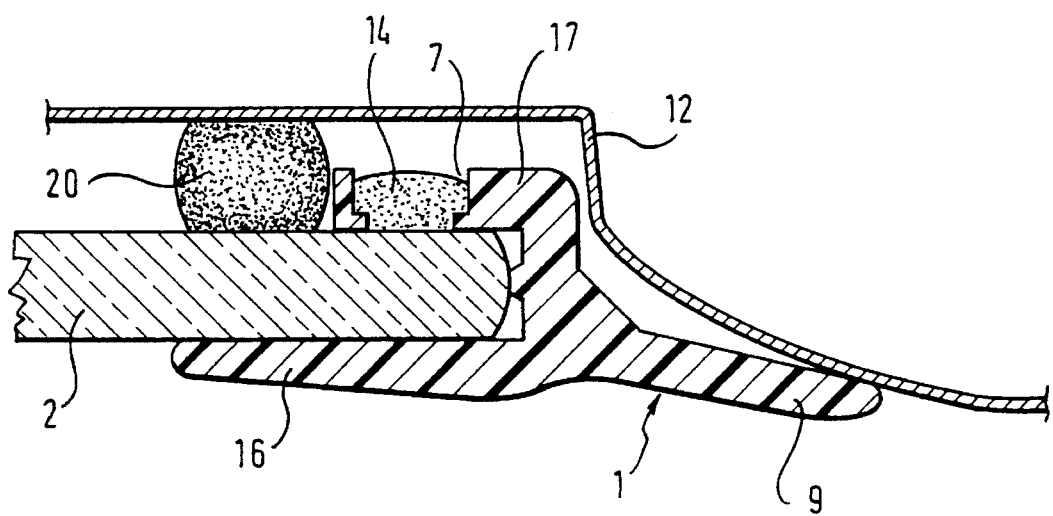
FIG. 5 is a similar section view as FIG. 4 wherein the additional adhesive sealant is compressed.

According to the embodiment shown in FIGS. 4 and 5, a bead of adhesive 20 is provided which cures before the body window is assembled to the body sheetmetal 12. As shown in FIG. 5, the cured adhesive 20 is compressed during assembly so as to provide a seal between the body window and the body sheetmetal. Similar to the embodiment exemplified by FIGS. 1–3, the adhesive 14 which bonds the leg 17 of the frame 1 to the glass pane 2 is also received in the channel 7.

Figure 6:
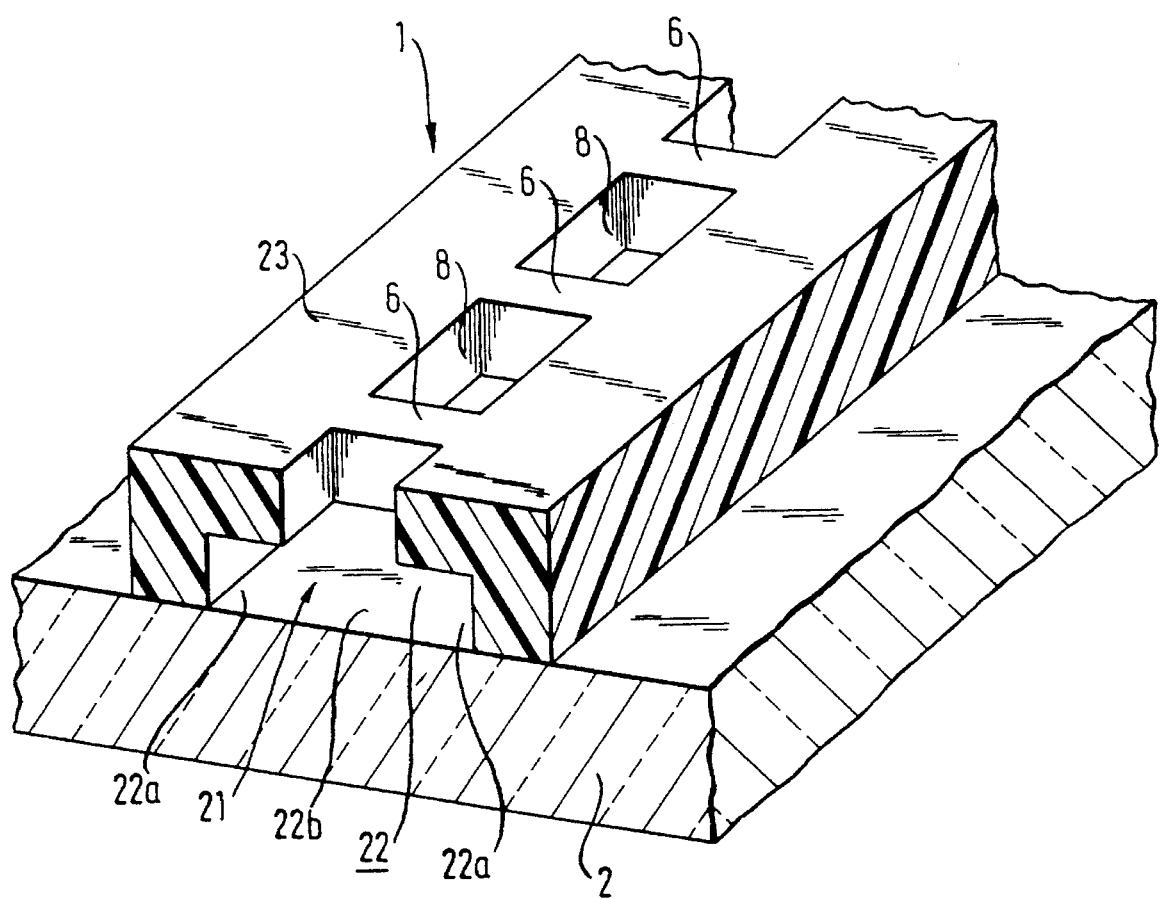
FIG. 6 is a perspective view of a first embodiment of the frame according to the present invention.

FIG. 6 is an alternative embodiment in which the orientation of a channel 22 with respect to the glass pane 2 is inverted, as compared to the channel 7. That is to say, in the embodiment of FIG. 6, the base of the U-shaped channel is spaced from the glass pane by the legs of the U-shaped channel, whereas in the embodiment of FIGS. 1–3 the base is contiguous with the pane of glass and the legs project away from the glass pane. In both embodiments, apertures 8 provide a passageway for the adhesive 14 gripping the glass pane 2. The inverted orientation of the channel 22 makes full use of the available segment 21 of the glass pane surface between the channel legs for adhesion. The entirety of the area 22a of the opening of the channel 22 is available for bonding by adhesive to the equally large area 22b of the pane 2.

Adhesive passes through the apertures 8 into the channel 22 where it spreads by virtue of its appropriately selected consistency. In the adhesive filled state, the expansion forces generated in the channel 22 will be spread across the entire areas 22a and 22b of the frame 1 and the glass pane 2, respectively.

Crossbars 6 separating the apertures 8 no longer reduce the two bonding surfaces in the embodiment of FIG. 6. Consequently, strength is no longer degraded by the fact that, as in the previous embodiment of FIGS. 1–3, the bonding area of the channel 7 is limited to the apertures 8.

Figure 7:
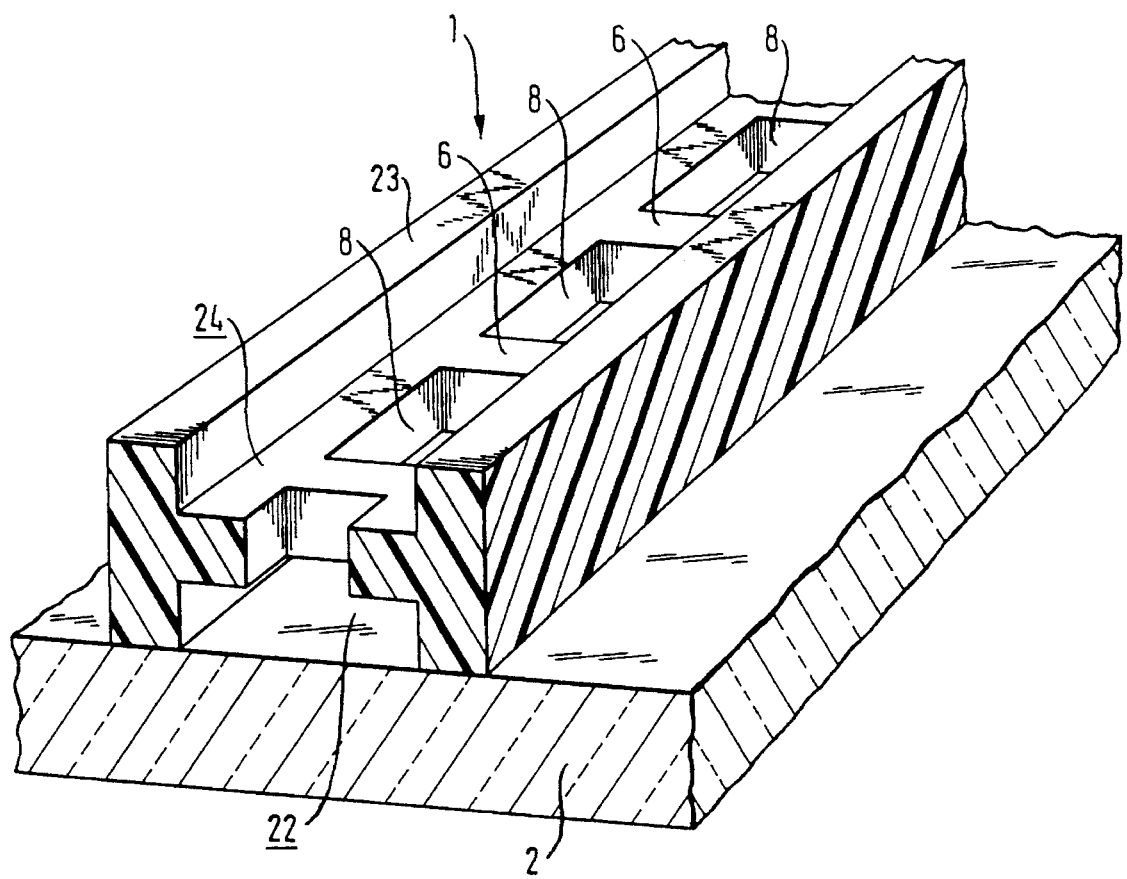
FIG. 7 is a perspective view of a second embodiment of the frame according to the present invention.

The relative sizes of the apertures 8 and the channel 22 are exaggerated for clarity in FIGS. 6 and 7. In fact, the difference in width between the apertures 8 and the channel 22 is less than shown.

Figure 9:
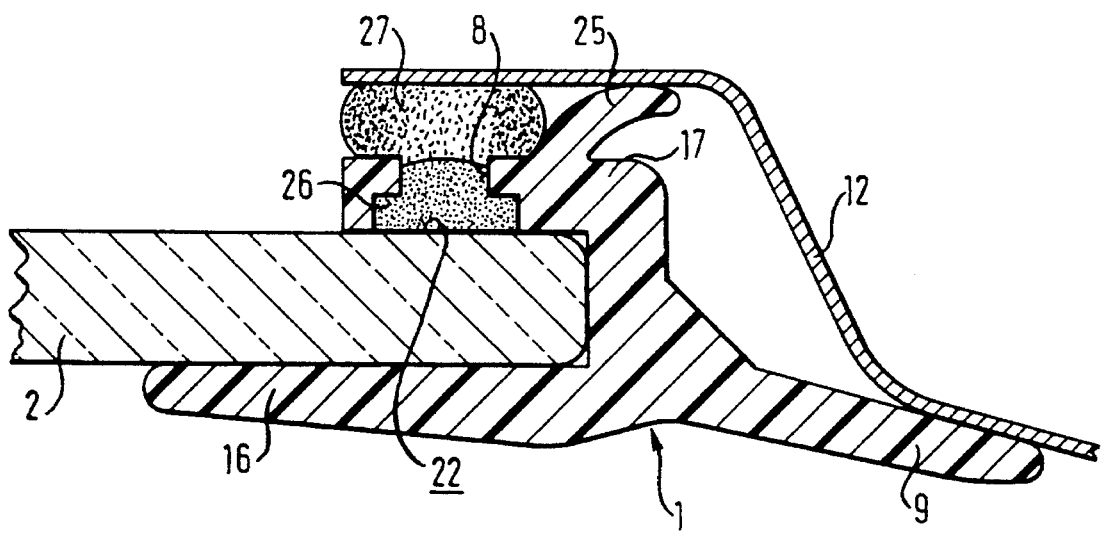
FIG. 9 is a section view showing the embodiment of FIG. 8 in an assembled state.

The embodiment of FIG. 6 moreover allows metering the amount of adhesive 14 in such a way that in a pre-assembly state, the apertures 8 may be overfilled on the side facing the body sheetmetal 12 (please see FIG. 9). Concomitantly with connecting the glass pane 2 and the frame 1, the body sheetmetal 12 can touch the adhesive 14 during assembly such that direct bonding between both sides of the apertures 8 and the body sheetmetal 12 by the adhesive 14 is feasible.

To further increase adhesion, a second channel 24 is shown in the embodiment of FIG. 7. The second channel 24 is provided on the side of the frame 1 which is opposite the first channel 22 and faces the body sheetmetal 12. Locating the crossbars 6 or the like at the base of both the first channel 22 and the second channel 24 increases the area available on both sides of the frame 1 for the adhesive 14 to mount and retain the glass pane 2 with respect to the frame 1.

Figure 8:
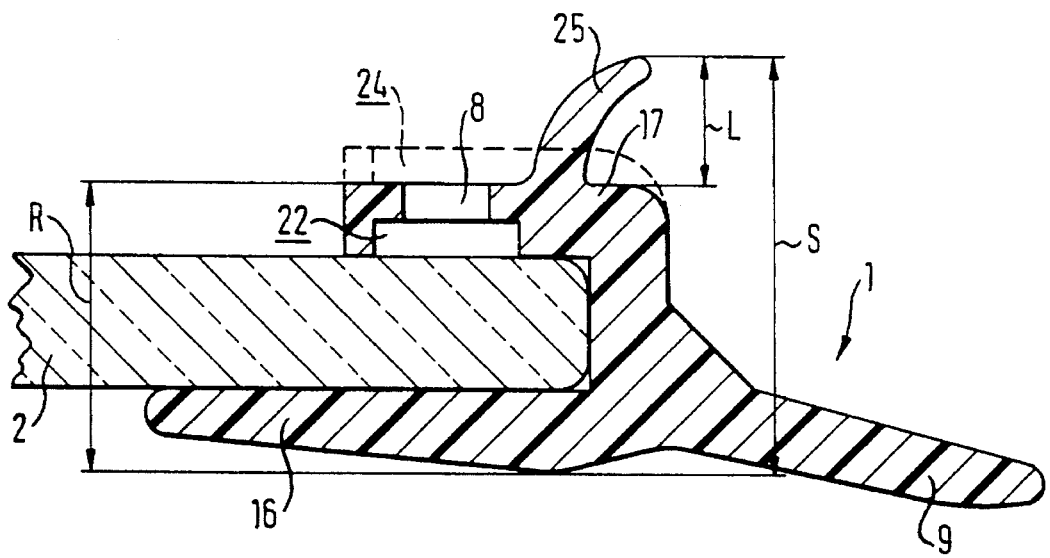
FIG. 8 is a similar section view as FIG. 2 having a channel for the adhesive which both connects the clearances and faces the glass pane.

According to the embodiment of the present invention shown in FIGS. 8 and 9, a flexible sealing lip 25 is present on the frame 1 generally adjacent to the sealing lip 9 and relatively more proximate to the apertures 8. In the assembled state shown in FIG. 9, the flexible sealing lip 25 is deformably prestressed against the body sheetmetal 12.

FIG. 8 shows the relative position of the channel 22 facing the glass pane 2, prior to this pane being assembled with the body sheetmetal 12. Further, FIG. 8 shows how the bonding area is increased by the design of the channel 22 as opposed to the channel 7 shown in FIGS. 1–3. According to the dashed lines in FIG. 8, the further channel 24 may be provided, which then makes available the additional bonding area on the opposite side of the frame 1 as does channel 22.

Inasmuch as there is a danger of moisture entering the space between the body sheetmetal 12 and the frame 1, especially when using open-pore foam adhesives such as those discussed below, sealing may be required. Such sealing is implemented by the sealing lip 25.

Referring again to FIG. 8, the sealing lip 25 may have a length L which is about one third the total thickness S, which in turn is approximately equivalent to the thickness of the glass pane 2 plus two frame thicknesses R.

FIG. 9 shows the apertures 8, as well as channels 22 and 24, are filled with adhesive, preferably a polyurethane foam adhesive. A bead of adhesive 26 is deposited in the apertures 8 and the channel 22, and a further bead of adhesive 27 is deposited on the bead of adhesive 26 to provide a connection between the glass pane 2 and the body sheetmetal 12, as well as filling in the channel 24. Both beads of adhesive 26 and 27 may be prestressed during the assembly of the body window with the both sheetmetal 12, thereby enhancing the filling of the channels 22 and 24. As a rule, filling the channel(s) and apertures, and hence the bonding takes place with the workpiece horizontal, that is in a position as shown by the Figures. The consistency of the adhesive is selected so as to flow into the channel(s) and apertures, and also to cure without substantial downward outflow.

The superposition of two beads of adhesive 26 and 27 described in relation to FIG. 9 saves a relatively significant amount of adhesive as compared with the exemplary embodiment shown in FIGS. 4 and 5. Consequently, the superposition of two beads of adhesive 26 and 27, is also employed in the exemplary embodiments shown in FIGS. 10 and 11.

Figure 10:
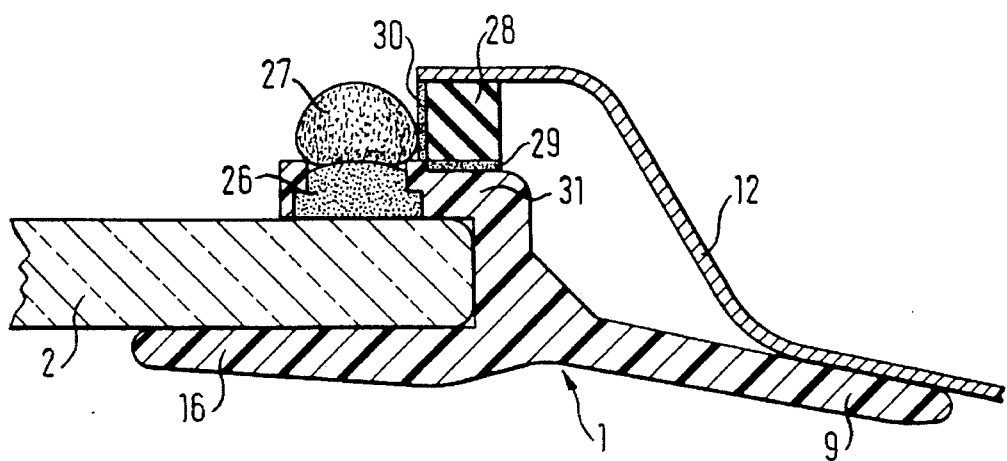
FIG. 10 is a similar section view as FIG. 9 showing another assembled embodiment according to the present invention.

With regard to the embodiment disclosed in FIG. 10, the sealing lip 25 used in the embodiment of FIGS. 8 and 9 is replaced by a separate, adhering bar 28, preferably of sponge rubber. The adhering bar 28 is affixed by two segments 29 and 30 of a double-sided adhesive tape to the frame 1 and the adhesive bead 27, respectively. As further shown in FIG. 10, the glass pane 2 projects into the frame 1 such that the sealing bar 28 and the glass pane 2 overlap. This makes it possible for the largest possible area of the adhering bar 28 to be prestressed between the associated body sheetmetal 12 and the associated frame segment 31 during assembly.

Figure 11:
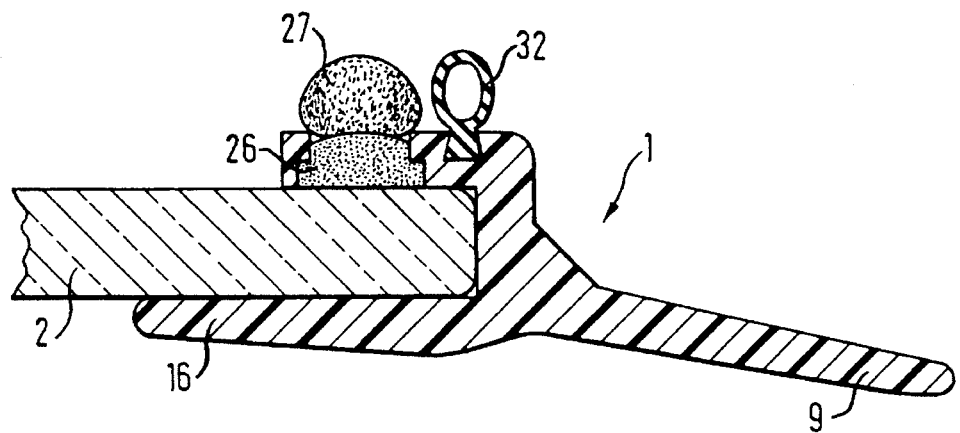
FIG. 11 is a similar section view as FIG. 8 showing yet another embodiment according to the present invention.

FIG. 11 shows an embodiment similar to that shown in FIG. 10 in which the square sponge-rubber bar 28 is replaced by a tubular shape 32 made of rubber or a rubbery plastic, preferably hard rubber.

Figure 12:
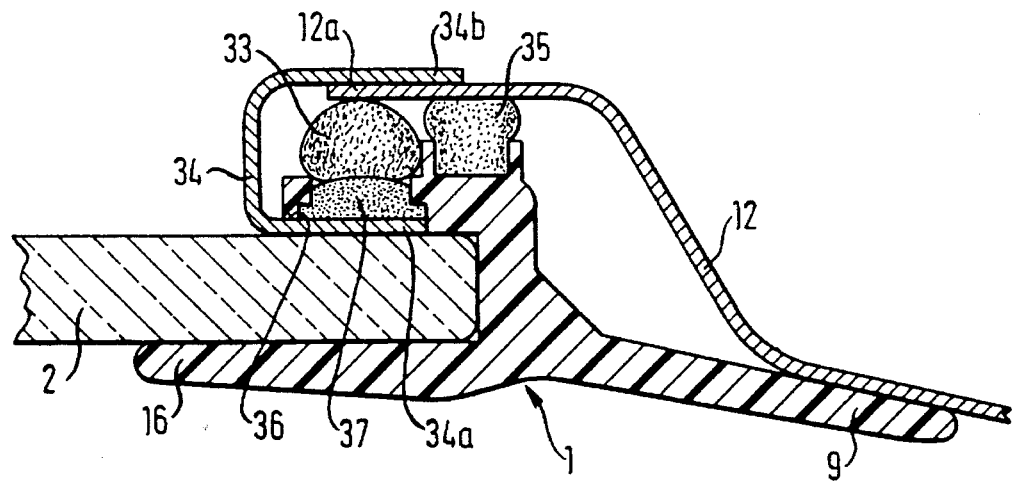
FIG. 12 is a similar section view as FIG. 9 for still another assembled embodiment according to the present invention.

Alternatively, the beads of adhesive 33 and 37 may assume the configuration of the embodiment shown in FIG. 12 wherein they consist of foam. This embodiment offers the advantages of economy and relatively rapid curing, as well as secure fixation within relatively small cross-section frames 1. Additionally, the embodiment of FIG. 12 may include a further adhesive member 35 in the manner of the adhesive members 28 and 32 according to the embodiments of FIGS. 10 and 11, again consisting appropriately of a foam, preferably a two-component polyurethane foam.

Fastener clamps 34 may be provided around the frame 1 to hold the glass pane 2 in place prior to assembly. Clamps 34 are shown in the embodiment of FIG. 12 with one leg 34a engaging grooves 36 in the frame 1 and another leg 34b spanning the free end, or free edge, 12a of the body sheetmetal 12.

The beads of adhesive or plastic 33,37 are also prestressed in this design by the affixing clamps 34.

What is claimed is:

1. A car-body window frame assembly with a peripheral frame embracing a glass pane having first and second faces, said assembly comprising:

a first leg of the frame contiguous with the first face;

a second leg of the frame contiguous with the second face, the second leg is interposed between the glass pane and sheetmetal of the car-body;

a first channel forming a recess extending parallel to the second face, said first channel being defined by at least one surface;

a plurality of apertures piercing said at least one surface of said second leg; and, adhesive extending through said plurality of apertures and adhesively bonding to the glass pane, wherein said first channel provides for fluid communication between said plurality of apertures.

2. The car-body window assembly defined in claim 1, wherein said adhesive does not adhere to the frame.

3. The car-body window assembly defined in claim 1, further comprising:

a first channel in said second leg facing the second face, said at least one aperture is in fluid communication with said first channel and said first channel is substantially filled with said adhesive through said at least one aperture.

4. The car-body window assembly defined in claim 3, wherein said adhesive overfills said first channel and said at least one aperture, and concomitantly said adhesive bonds to said sheetmetal of the car-body.

5. The car-body window assembly defined in claim 3, further comprising:

a second channel 24 in said second leg facing said sheetmetal of the car-body, and said at least one aperture provides fluid communication between said first channel and said second channel.

6. The car-body window assembly defined in claim 5, further comprising:

additional adhesive substantially filling said second channel as well as extending between and bonding the frame to said sheetmetal of the car-body.

7. The car-body window assembly defined in claim 1, further comprising:

a flexible sealing lip interposed between the frame and said sheetmetal of the car body, said flexible sealing lip in an assembled state of the assembly is prestressed against the sheetmetal of the car-body.

8. The car-body window assembly defined in claim 1, wherein said adhesive is a closed-pore foam.

9. The car-body window assembly defined in claim 1, wherein said adhesive is an open-pore foam.

10. The car-body window assembly defined in claim 7, wherein said sealing lip has a dependant length L corresponding approximately to one-third the total thickness S of the glass plane plus two frame-thicknesses R.

11. The car-body window assembly defined in claim 1, further comprising:

adhering bar means for preventing moisture transmission, said adhering bar means is interposed between the frame and said sheetmetal of the car body.

12. The car-body window assembly defined in claim 11, wherein said adhering bar means evinces a square cross-section and consists of sponge rubber.

13. The car-body window assembly defined in claim 12, further comprising:

double-faced adhesive tape connecting said adhering bar means to said adhesive and the frame.

14. The car-body window assembly defined in claim 12, further comprising:

fastening clamps 34 holding the glass pane 2 with respect to the frame, said clamps engaging a groove on said second leg and spanning to said sheetmetal of the car-body.

15. A car-body window frame assembly with a peripheral frame embracing a glass pane having first and second faces, said assembly comprising:

a first leg of the frame contiguous with the first face;

a second leg of the frame contiguous with the second face, the second leg is interposed between the glass pane and sheetmetal of the car body;

a plurality of apertures piercing said second leg, said apertures being separated by crossbars integrally formed in said second leg;

at least one channel formed in said second leg and in fluid communication with said apertures; and, first adhesive extending through said apertures and communicating with said channel, said first adhesive adhesively bonding to the glass pane and forming a positive connection between said second leg and said glass pane.

16. The car-body window assembly recited in claim 15, wherein said channel faces said second face.

17. The car-body window assembly recited in claim 15, wherein said channel is formed opposite said glass pane with respect to said aperture, said channel in communication with said first adhesive.

18. The car-body window assembly recited in claim 15, wherein said first adhesive extends from said glass pane through said aperture and contacts said sheetmetal of the car body.

19. The car-body window assembly recited in claim 15, further comprising a separate bead of adhesive extending from said glass pane to said sheetmetal of said car-body, wherein said separate bead of adhesive is positioned adjacent a terminal edge of said second leg and is offset from said first adhesive.

* * * * *